United States Patent
Gershinsky et al.

(10) Patent No.: US 8,233,391 B2
(45) Date of Patent: Jul. 31, 2012

(54) SYSTEM, METHOD AND COMPUTER PROGRAM PRODUCT FOR TRANSMITTING DATA ENTITIES

(75) Inventors: Gidon Gershinsky, Haifa (IL); Avraham Harpaz, Haifa (IL); Nir Naaman, Haifa (IL); Harel Paz, Carmiel (IL); Konstantin Shagin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 11/842,152

(22) Filed: Aug. 21, 2007

(65) Prior Publication Data
US 2009/0052318 A1 Feb. 26, 2009

(51) Int. Cl.
*G01R 31/08* (2006.01)
*H04L 12/28* (2006.01)

(52) U.S. Cl. ......... 370/232; 370/248; 370/412; 370/416

(58) Field of Classification Search .......... 370/229–235, 370/236, 236.1, 248
See application file for complete search history.

(56) References Cited

U.S. PATENT DOCUMENTS

| | | | | |
|---|---|---|---|---|
| 5,694,390 A | * | 12/1997 | Yamato et al. | 370/230 |
| 6,018,515 A | | 1/2000 | Sorber | |
| 6,122,254 A | * | 9/2000 | Aydemir et al. | 370/235 |
| 6,625,121 B1 | * | 9/2003 | Lau et al. | 370/230 |
| 6,654,342 B1 | * | 11/2003 | Dittia et al. | 370/229 |
| 6,678,244 B1 | * | 1/2004 | Appanna et al. | 370/229 |
| 6,700,876 B1 | * | 3/2004 | DiNicola et al. | 370/252 |
| 7,000,025 B1 | | 2/2006 | Wilson | |
| 7,146,438 B2 | | 12/2006 | Han | |
| 2003/0046426 A1 | * | 3/2003 | Nguyen | 709/242 |
| 2003/0118044 A1 | * | 6/2003 | Blanc et al. | 370/414 |
| 2003/0139145 A1 | | 7/2003 | Lee et al. | |
| 2004/0066743 A1 | | 4/2004 | Shimojo et al. | |
| 2005/0135396 A1 | * | 6/2005 | McDaniel et al. | 370/412 |
| 2007/0076598 A1 | * | 4/2007 | Atkinson et al. | 370/229 |
| 2007/0223377 A1 | * | 9/2007 | de Heer | 370/235 |
| 2007/0223504 A1 | * | 9/2007 | Jain et al. | 370/412 |
| 2007/0268826 A1 | * | 11/2007 | Balakrishnan et al. | 370/230 |
| 2008/0159129 A1 | * | 7/2008 | Songhurst et al. | 370/229 |

OTHER PUBLICATIONS

N. Yin et al., "Congestion control for packet voice by selective packet discarding", *IEEE Transactions on Communications*, v 38, n 5, May 1990, p. 674-683.

L. Magalhaes et al., "MMTP—multimedia multiplexing transport protocol", Source: http://historical.ncstrl.org/tr/pdf/uiuc_cs/UIUCDCS-R-2000-2156.pdf.

S. Manfredi, "An AQM Routing Control for reducing congestion in Communication Networks", Source: http://viola.usc.edu/paper/ISCAS2005/Papers/B1P-U7.pdf.

* cited by examiner

*Primary Examiner* — Brandon Renner

(57) ABSTRACT

A method, system and computer program product for transmitting data entities, the method includes: receiving data entities to be transmitted over multiple channels; and preventing a transmission of data entities that are to be transmitted over congested channels while transmitting data entities that are to be are to be transmitted over non-congested channels.

20 Claims, 3 Drawing Sheets

SYSTEM, METHOD AND COMPUTER PROGRAM PRODUCT FOR TRANSMITTING DATA ENTITIES

FIELD OF THE INVENTION

The present invention relates to methods, systems and computer program products for transmitting data entities.

BACKGROUND OF THE INVENTION

Messages can be transmitted over multiple channels that span between a transmitter and one or more receivers. These channels can be congested due to various reasons including processing resource limitations, memory resource limitation, inefficient load balancing, transient failures along the data paths, and the like.

The congestion level of channels can change rapidly and in many cases can be hard to predict. Typically a scheduler that schedules a transmission of messages over multiple channels can not track these congestion level changes and multiple messages are sent over congested channels.

It is known in the art that transmitting a message over a congested channel has many downfalls, including but not limited to higher probability of message transmission failure (complete failure or partial failure), relatively long latency and, additionally or alternatively, increasing the congestion level of that channel. These downfalls can have an even greater impact when the messages belong to real time traffic and, additionally or alternatively, are included within frames that can be totally corrupted even if a portion of the frame or picture is dropped.

When the messages are transmitted by using unreliable delivery methods (UDP, raw IP), the dropped message is not re-transmitted to its target. When the messages are transmitted by using reliable delivery methods (TCP), the transmitter will be notified, in some way, about the lost messages and eventually will retransmit them.

However, since retransmission consumes time and several retransmissions may be required, a message can miss its deadline that is implicitly determined by its latency budget. A deadline miss has a negative impact in soft real-time systems and is unacceptable in hard-real time systems. For example, an unmanned aerial vehicle can crash into another flying object or a building if a command to change direction is delivered too late.

There is a need to provide an efficient method, system and computer program product for transmitting data entities.

SUMMARY OF THE PRESENT INVENTION

A method for transmitting data entities, the method includes: receiving data entities to be transmitted over multiple channels; and preventing a transmission of data entities that are to be transmitted over congested channels while transmitting data entities that are to be transmitted over non-congested channels.

Conveniently, the method includes determining which channels are congested.

Conveniently, the determining is responsive to at least one transmission attempt over at least one channel.

Conveniently, the determining is responsive to at least one congestion indication provided by at least one entity through which the data entity is transmitted.

Conveniently, the preventing includes masking congested channel queues.

Conveniently, the method includes updating, substantially in real time, a non-congested channel data structure and a congested data structure.

Conveniently, the method includes scheduling a transmission of data entities regardless of congestion levels of channels through which these data entities should be transmitted and overriding the scheduling in view of the congestion level of these channels.

Conveniently, the scheduling is responsive to at least one attribute selected from a group consisting of an urgency of data entity and a priority of the data entities.

Conveniently, the transmitting includes transmitting data entities over channels that are characterized by different transmission characteristics.

Conveniently, the transmitting includes transmitting multiple data entities substantially simultaneously.

Conveniently, the method includes sorting queues according to an urgency of a most urgent data entity of each queue.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
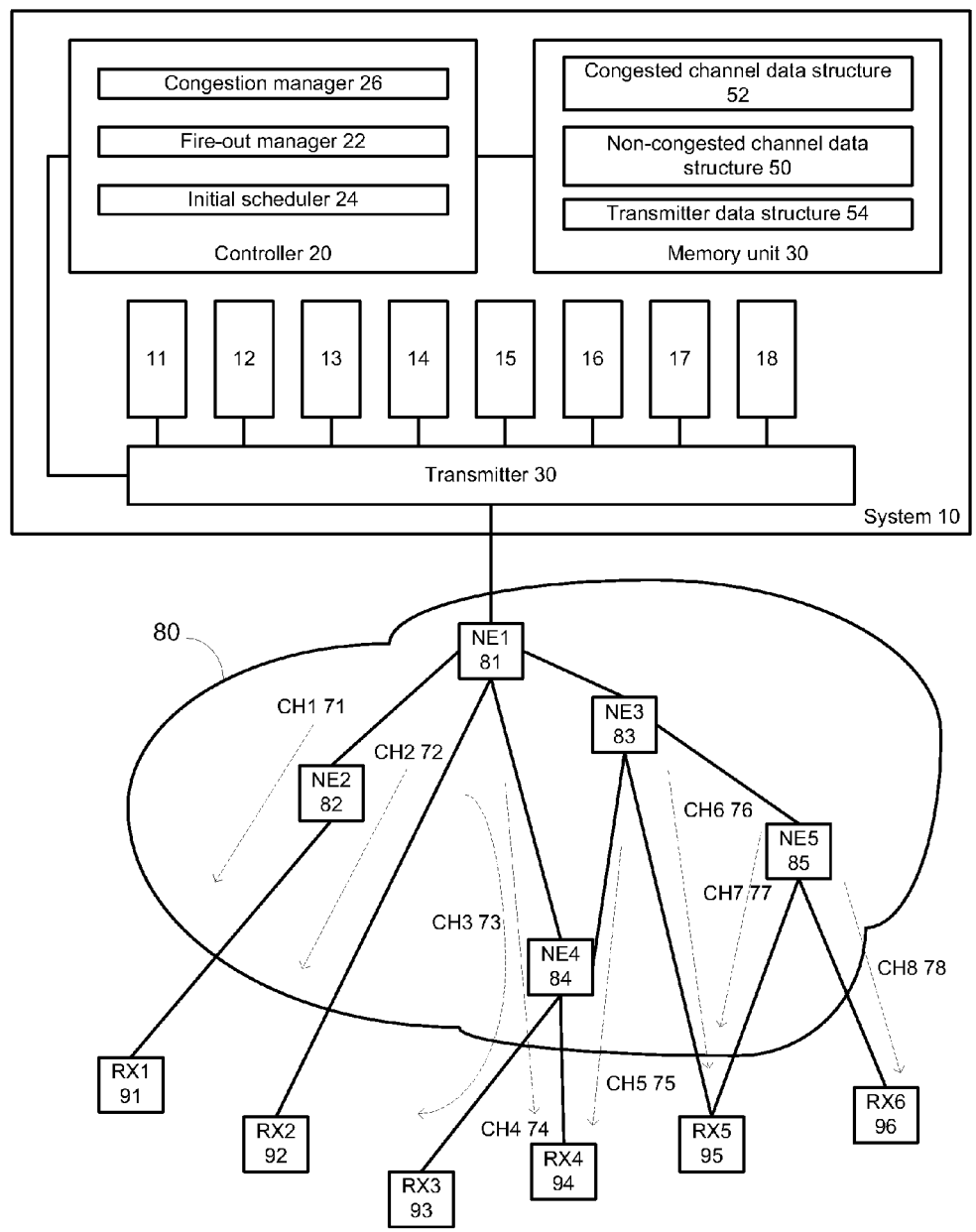
FIG. 1 illustrates a system and its environment, according to an embodiment of the invention.

Methods, systems and computer program products for transmitting data entities are provided. For simplicity of explanation it is assumed that the data entities are messages, but his is not necessarily so. Data entities can include a packet, a frame, a multiplex of data entities, can convey information, video, audio and the like.

Conveniently, the method includes: (i) receiving multiple packets to be transmitted over multiple channels, and (ii) preventing a transmission of data entities to be transmitted over congested channels while transmitting data entities to be transmitted over non-congested channels. Accordingly, data entities to be transmitted over congested channels do not delay the transmission of data entities over non congested channels, even if the priority and/or urgency of the former exceed the priority and/or urgency of the latter.

A channel represents a path through which a data entity is expected to propagate. If a single receiver can be reached by multiple paths then each path can be represented by a different channel. A channel does not necessarily represent a point-to-point link. Its destination may be a multicast address, a collection of unicast addresses and even a broadcast address. Thus, a channel may be used for transmission to a plurality of receivers.

The congestion level of the various channels can be constantly and/or frequently monitored in order to increase the efficiency of the mentioned above transmission scheme. The mentioned below explanation describes a binary congestion level (either congested or not) but this is not necessarily so and multiple congestion levels can be introduced.

Conveniently, the transmission of data entities, whose channel is known to be congested, is delayed until congestion clears.

The data entities destined to be transmitted over non-congested channels can be transmitted according a scheduling scheme. The scheduling scheme illustrated below is based upon an urgency of data entities. It is noted that other scheduling schemes can be applied without departing from the true spirit of the invention.

Conveniently, a system maintains queues (associated with channels) that are managed in a manner that enables the most urgent message whose path is not congested to be immediately available to a transmitter. This involves sorting the queues in a descending order according to the urgency of the data entity located at the head of each queue and allowing the transmitter to access this sorted list.

It is noted that the suggested methods, systems and computer program product can facilitate a transmission over multiple channels that differ from each other by their transmission characteristics (including, for example their reliability level). This is conveniently facilitated by representing the channels in a manner than ignores the transmission characteristics. Various data structures (such as a congested and non-congested data structure and a transmitter data structures) are conveniently indifferent to the transmission characteristics of the channels.

The transmission characteristics can be represented by one or more data entity attributes and can be used to determine a mechanism used for transmission of the data entity as well as affect how congestion should be detected.

FIG. 1 illustrates system 10 and its environment, according to an embodiment of the invention.

It is noted that various components of system 10, including controller 30 can be implemented by hardware, firmware, software of a combination thereof.

System 10 includes controller 20, transmitter 30 and memory unit 40. System 10 is connected to network 80 that in turn is connected to receivers 91-96.

For simplicity of explanation system 10 is illustrated as having a single output port 19, but this is not necessarily so. It is further noted that the number of queues, receivers, channels and networks as well the connections illustrated in FIG. 1 are provided as sample only.

Receivers (denoted 'RX') 91-96 are connected to system 10 via eight different channels 71-78, each associated with a dedicated queue out of queues 11-18. The channels pass through various network entities denoted as NE1-NE5 81-85. These network entities can provide indications about congested channels. It is noted that congestion can occur and be detected by the transmitters. For example, in TCP, the receiver indicates to the transmitter that it cannot accommodate more data. As a result the send operation on the transmitter blocks or returns an indication that the data or a part of it could not be sent.

Memory unit 40 maintains queues 11-18, non-congested channel data structure 50, congested channel data structure 52 and transmitter data structure 54. Queues 11-18 store data entities, wherein each queue stores data entities destined to be transmitted over a unique channel. The data entities within each queue are sorted according to their urgency so that the most urgent data entity is located at the head of the queue.

It is noted that the data entities within each queue can also be sorted according to additional and/or other parameters.

Non-congested data structure 50 stores the identities of channels that are currently not congested. Congested channel data structure 52 stores the identities of channels that are currently congested.

Figure 2:
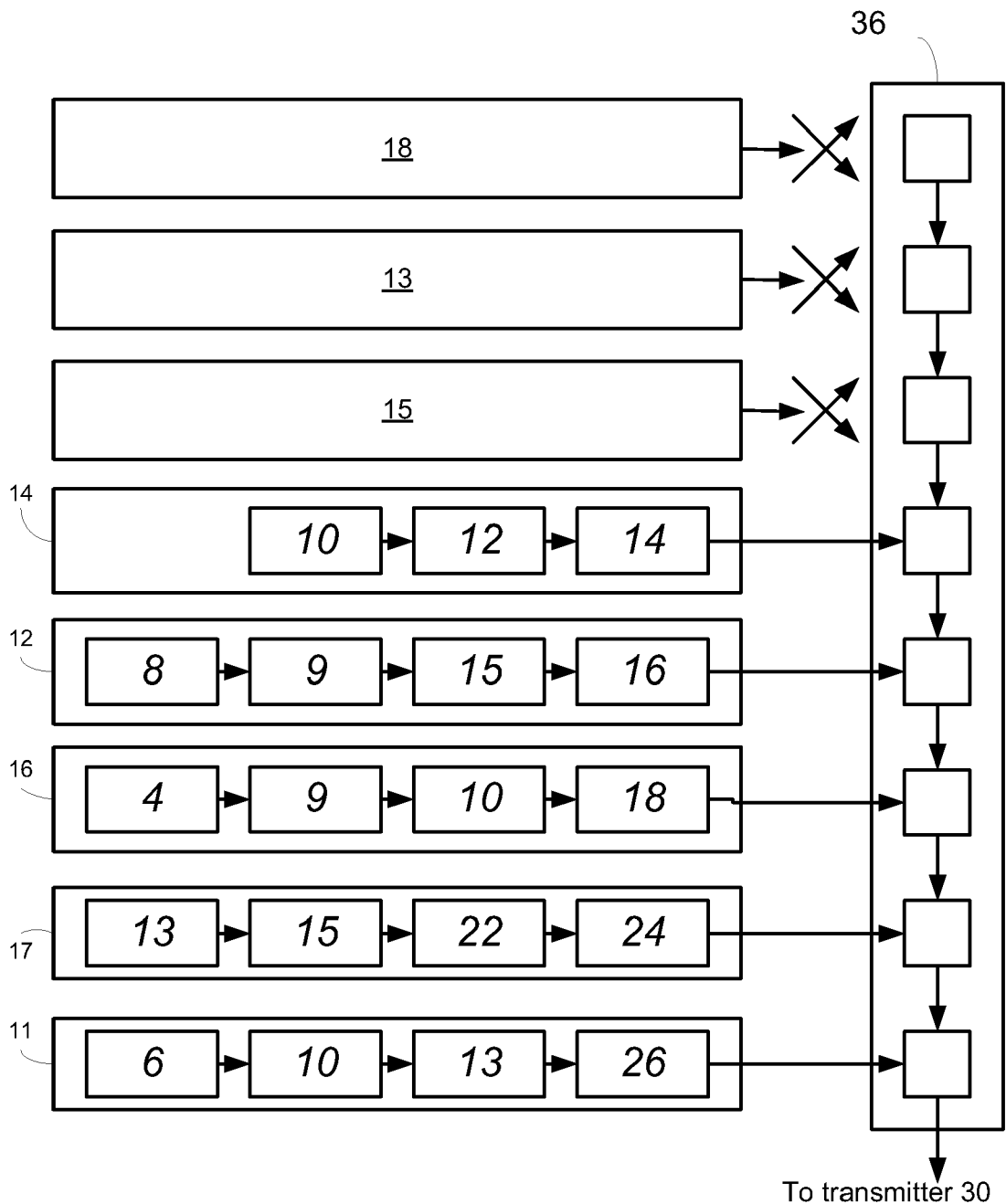
FIG. 2 illustrates a data structure, according to an embodiment of the invention.

Transmitter data structure 54 is illustrated in further details in FIG. 2. It includes transmitter queue 56 that is linked to the head of sorted queues 11-18, and especially to head of queues associated with non-congested channels. By sorting the queues according to their most urgent data entities, transmitter queue 36 is constantly fed with the most urgent data entities.

FIG. 2 illustrates five queues 11, 17, 16, 12 and 14 that are associated with of non-congested channels 71, 77, 76, 72 and 74 as well as three queues 15, 13 and 18 that are associated with congested channels 75, 73 and 78. Queues 15, 13 and 18 are illustrated as being isolated from transmitter queue 36.

Queues 11, 17, 16, 12 and 14 are sorted according to the urgency of their head of queue data entities, starting from the most urgent data entity. The urgency score of each data entity is illustrated in italics.

It is noted that once a previously congested channel becomes non-congested it is removed from congested data structure 52 to non-congested data structure 50. The queue associated with this channel can participate in the sorting process.

New channels can be regarded as non-congested channels, but other defaults can be defined.

Controller 20 controls an operation of system 10 and especially schedules the transmission of data packets stored in queues 11-18. Conveniently, controller 20 includes initial scheduler 24, fire-out manager 22 and congestion manager 26.

Initial scheduler 24 conveniently schedules a transmission of data entities within queues 11-18 regardless of the congestion level of the channels associated with these queues. It can apply various prior art scheduling and/or arbitration polices and can be responsive to various parameters including but not limited to priority of a data packet, urgency of a data packet, fairness parameters and the like. It can sort the data entities within each queue according to its urgency.

Congestion manager 26 can maintain the congested channel data structure 52. It can receive indications that a channel is congested, add this channel to the congested data structure 52, try do determine when a congested channel stops being congested and then remove this channel from the congested data structure 52.

Congestion manager 26 can determine if a channel is not congested and can also be responsive to congestion indications provided from other entities, including from fire-out manager 22, receivers that are destined to receive the data entities, as well as entities located along a channel through which data entities should be transmitted. These entities can send a congestion indication by monitoring their stack status, the delay associated with a transmission of the data entity, and the like.

Fire-out controller 22 can maintain non-congested channel data structure 50. It can receive indications that a previously congested channel is not congested (such as indication can be provided from congestion manager 26) and try to determine which data entity that is destined to a non-congested channel should be transmitted. Fire-out controller 22 can receive a transmission schedule generated by initial scheduler 24 and mask transmissions associated with congested channels as determined by the congested channel data structure 52.

Fire-out controller 22 can sort queues associated with non-congested channels and transmit the data entities from these queues according to their urgency. It is noted that once a data entity from a certain queue is transmitted (or at least provided to transmitter queue 36) fire-out controller 22 performs a sorting operation that is responsive to the urgency of the new head of queue data entity of that certain queue.

Conveniently, fire-out controller 22 also can determine that a channel is congested by monitoring the success of a transmission of one or more data entities through that channel. It is noted that fire-out controller 22 can be responsive to congestion indication provided from other entities.

A determination relation to a congestion of a certain channel can be responsive to an outcome (return value) of a send operation. The return value allows the caller to determine whether a message has been successfully transmitted, partially transmitted or was not transmitted at all. In addition, the return value can implicitly or explicitly indicates whether the channel is congested. For instance, a failure to transmit the whole message may be such an indication.

Yet according to an embodiment of the invention more then two congestion levels can be introduced and the scheduling of transmission can be responsive to these multiple congestion levels, while encouraging a transmission of data entities from less congested channels.

Figure 3:
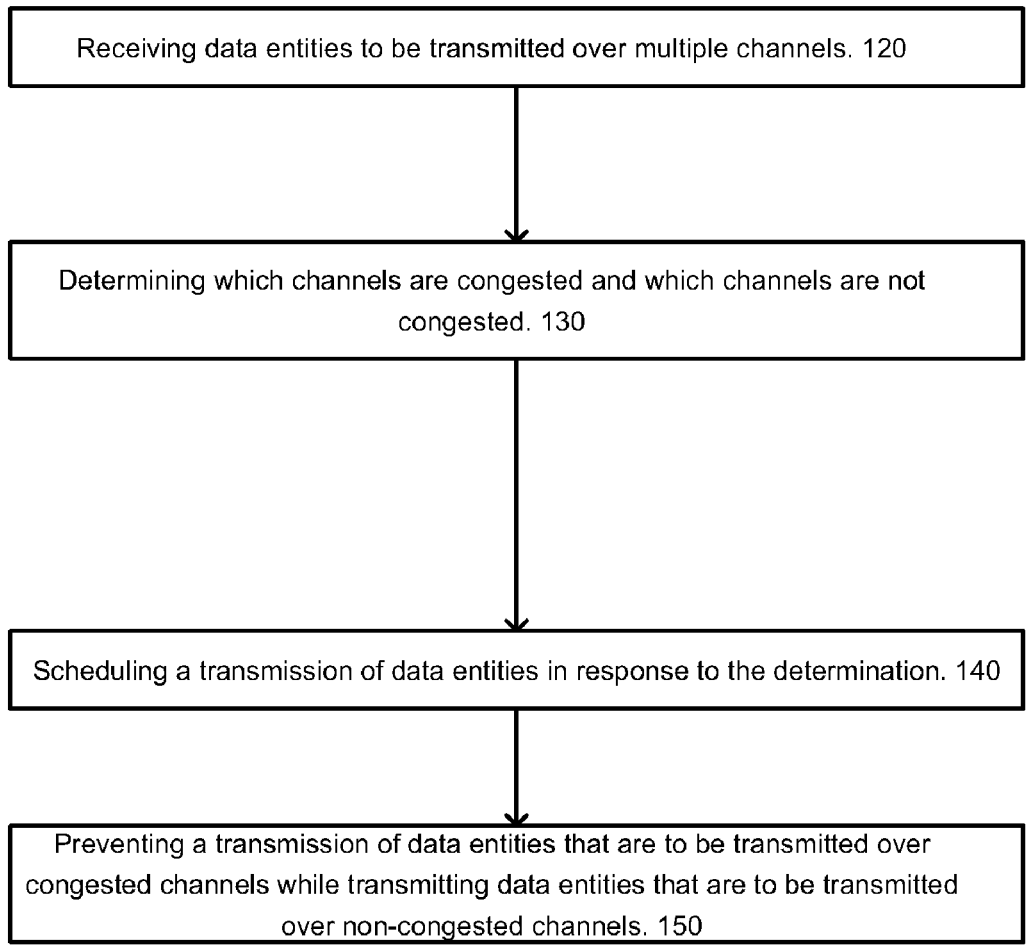
FIG. 3 illustrates a method for transmitting data entities, according to an embodiment of the invention.

FIG. 3 illustrates method 100 for transmitting data entities according to an embodiment of the invention.

The following flow chart illustrates a sequence of stages. It is noted that these stages can be executed out of order, in a parallel manner and additionally or alternatively, at least in a partially overlapping manner. For example, while certain data entities are received, a congestion level of a channel can be determined and yet other data entities can be transmitted.

Method 100 starts by stage 120 of receiving data entities to be transmitted over multiple channels. Referring to the example set fourth in FIG. 1, data entities can be received by queues 11-18 and are destined to be transmitted over channels 71-78.

Stage 120 is followed by stage 130 of determining which channels are congested and which channels are not congested. The determination of stage 130 can be responsive to at least one transmission attempt over a channel, to congestion indications provided by entities located along the multiple channels, to indications provided by receivers, and the like. Referring to the example set fourth in FIG. 1, system 10 and especially fire-out manager 22 and congestion manager 26 can determine which channels are congested and update congested channel data structure 52 and non-congested data structure 50.

Conveniently, the determination is made substantially in real time. Such a determination is followed by updating, substantially in real time, a non-congested channel data structure and a congested data structure.

Stage 130 is followed by stage 140 of scheduling a transmission of data entities in response to the determination.

According to an embodiment of the invention the scheduling process is executed in two phases. During a first phase (that is not necessarily included in stage 140) the transmission of data entities is scheduled regardless of a congestion level of channels through which these data entities should be transmitted. The outcome of this first phase can be referred to as an initial scheduling scheme. This first phase can occur prior to stage 130 and can be characterized by scheduling cycles that are slower than changes in the congestion level of the channels.

The initial scheduling scheme can be based entirely on parameters specified by the user, such as priority and latency budget, but this is not necessarily so. The initial scheduling scheme is not aware and not responsive to congestions. The transmission of data entities that are to be transmitted over non-congested channels can be responsive to that initial scheduling scheme. For example, the order (and if possible even the timing) of transmission of such data entities can be set according to the initial scheduling scheme. Conveniently, the initial scheduling scheme is violated only when it jeopardizes timely delivery.

During a second phase, stage 140 conveniently overrides this initial scheduling scheme by masking scheduled transmissions of data entities that should be transmitted over congested channels.

The scheduling can be responsive to at least one attribute selected from a group consisting of an urgency of data entity and a priority of the data entities. The scheduling can involve sorting the queues according to the urgency of their head of queue data entities. After masking queues associated with congested channels a sorted list of queues can be provided, as illustrated in FIG. 2.

Stage 140 is followed by stage 150 of preventing a transmission of data entities that are to be transmitted over congested channels while transmitting data entities that are to be transmitted over non-congested channels. Stage 150 is responsive to the scheduling of stage 140. Conveniently, the preventing includes masking congested channel queues.

Referring to the example set fourth in previous figures, fire-out manager 22 can determine to transmit data entities that are destined to be transmitted over non-congested channels only.

Stage 150 can include transmitting data entities over channels that are characterized by different transmission characteristics and/or transmitting multiple data entities substantially simultaneously.

According to another embodiment of the invention stage 140 includes limiting (and not preventing) a transmission of data entities over congested channels. Data entities that should be transmitted over congested channels can be transmitted in exceptional cases, for example, when they are the only high priority data entities, when they are much more urgent than other data entities, and the like.

The limiting of transmission can include applying a first scheduling policy when scheduling a transmission of data entities to be transmitted over non-congested channels and applying a second scheduling policy that differs from the first scheduling policy, in order to enable a transmission of at least one data entity over a congested channel.

The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for transmission control, comprising:
    receiving data entities, having respective precedence parameters, for transmission by a transmitter over a network via multiple, respective channels to respective receivers, each channel comprising a path from the transmitter to one or more of the receivers;
    arranging the data entities at the transmitter according to the respective precedence parameters in queues corresponding to the channels, such that for each channel a data entity with highest precedence is placed at a head of a respective queue;
    sorting the queues in a descending order according to the respective precedence parameter of the data entity located at the head of each queue so as to generate a sorted list of the queues;
    prior to the transmission of at least some of the data entities, grouping the channels in a congested group and a non-congested group by evaluating respective levels of congestion of the channels;
    and
    immediately transmitting the at least some of the data entities from the queues of the channels in the non-congested group in an order determined by the sorted list, while inhibiting transmission from the queues of the channels in the congested group.

2. The method according to claim 1, wherein the precedence parameters indicate at least one of a priority and an urgency of the data entities.

3. The method according to claim 1, wherein evaluating the respective levels of congestion comprises receiving congestion indications from network entities through which the channels pass.

4. The method according to claim 1, wherein evaluating the respective levels of congestion comprises receiving a congestion indication from a transmitter of the data entities.

5. The method according to claim 4, wherein receiving the congestion indication comprises evaluating a return value of a send operation on a given channel.

6. The method according to claim 1, wherein grouping the channels comprises maintaining a congested channel data structure and a non-congested data structure, and assigning each queue to one of the data structures.

7. The method according to claim 6, wherein evaluating the respective levels of congestion comprises detecting that a congestion status of a given channel has changed, and wherein assigning each queue comprises reassigning the queue corresponding to the given channel from one of the data structures to the other.

8. The method according to claim 6, wherein inhibiting the transmission comprises scheduling the transmission of the data entities, responsively to the respective precedence parameters, over the channels in the congested channel data structure, and then masking the scheduled transmission from the queues in the congested data structure.

9. A system for transmission control, comprising:
    a controller, which is configured to receive data entities, having respective precedence parameters, for transmission by a transmitter over a network via multiple, respective channels to respective receivers, each channel comprising a path from the transmitter to one or more of the receivers, to arrange the data entities at the transmitter according to the respective precedence parameters in queues corresponding to the channels, such that for each channel a data entity with highest precedence is placed at a head of a respective queue, to sort the queues in a descending order according to the respective precedence parameter of the data entity located at the head of each queue so as to generate a sorted list of the queues, and to group the channels in a congested group and a non-congested group prior to the transmission of at least some of the data entities, by evaluating respective levels of congestion of the channels, and responsively to the levels of congestion; and
    the transmitter, which is coupled to immediately transmit the at least some of the data entities from the queues of the channels in the non-congested group in an order determined by the sorted list, while the controller inhibits transmission from the queues of the channels in the congested group.

10. The system according to claim 9, wherein the precedence parameters indicate at least one of a priority and an urgency of the data entities.

11. The system according to claim 9, wherein the controller is coupled to receive congestion indications from network entities through which the channels pass.

12. The system according to claim 9, wherein the controller is coupled to receive a congestion indication from a transmitter of the data entities.

13. The system according to claim 12, wherein the congestion indication comprises a return value of a send operation on a given channel.

14. The system according to claim 9, wherein the controller is configured to maintain a congested channel data structure and a non-congested data structure, and to assign each queue to one of the data structures.

15. The system according to claim 14, wherein the controller is configured to detect that a congestion status of a given channel has changed, and to reassign the queue corresponding to the given channel from one of the data structures to the other.

16. The system according to claim 14, wherein the controller is configured to schedule the transmission of the data entities, responsively to the respective precedence parameters, over the channels in the congested channel data structure, and then to mask the scheduled transmission from the queues in the congested data structure.

17. A computer program product comprising a non-transitory computer usable medium including a computer readable program, wherein the computer readable program when executed on a computer causes the computer to receive data entities, having respective precedence parameters, for transmission by a transmitter over a network via multiple, respective channels to respective receivers, each channel comprising a path from the transmitter to one or more of the receivers, to arrange the data entities according to the respective precedence parameters in queues corresponding to the channels, such that for each channel a data entity with highest precedence is placed at a head of a respective queue, to sort the queues in a descending order according to the respective precedence parameter of the data entity located at the head of each queue so as to generate a sorted list of the queues, to group the channels in a congested group and a non-congested group prior to the transmission of at least some of the data entities, by evaluating respective levels of congestion of the channels, and responsively to the levels of congestion, and to immediately transmit the at least some of the data entities from the queues of the channels in the non-congested group in an order determined by the sorted list, while inhibiting transmission from the queues of the channels in the congested group.

18. The product according to claim 17, wherein the precedence parameters indicate at least one of a priority and an urgency of the data entities.

19. The product according to claim 17, wherein the program causes the computer to receive congestion indications from network entities through which the channels pass and from a transmitter of the data entities.

20. The product according to claim 17, wherein the program causes the computer to maintain a congested channel data structure and a non-congested data structure, and to assign each queue to one of the data structures.

* * * * *